(12) United States Patent
Stratakos (10) Patent No.: US 6,498,467 B1
(45) Date of Patent: Dec. 24, 2002

(54) ULTRA-LOW-POWER MODE FOR A VOLTAGE REGULATOR

(75) Inventor: Anthony J. Stratakos, Fremont, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 0 days.

(21) Appl. No.: 09/853,357

(22) Filed: May 11, 2001

Related U.S. Application Data (63) Continuation of application No. 09/797,892, filed on Mar. 1, 2001.

(51) Int. Cl.$^7$ .................................................. G05F 1/40
(52) U.S. Cl. ........................................ 323/284; 323/282
(58) Field of Search ................................ 323/284, 282, 323/285, 286, 299, 281, 303; 320/123, 40, 64

(56) References Cited

U.S. PATENT DOCUMENTS

| | | | | |
|---|---|---|---|---|
| 3,984,215 A | * | 10/1976 | Zucker | 323/903 |
| 4,041,363 A | * | 8/1977 | Scheidler | 320/123 |
| 4,315,208 A | * | 2/1982 | McElroy et al. | 323/303 |
| 4,319,179 A | * | 3/1982 | Jett, Jr. | 323/281 |
| 4,827,206 A | * | 5/1989 | Speas | 323/299 |
| 5,493,203 A | * | 2/1996 | Dalton | 323/282 |
| 6,127,815 A | | 10/2000 | Wilcox | |
| 6,131,813 A | * | 10/2000 | Knighton et al. | 235/454 |
| 6,215,286 B1 | * | 4/2001 | Scoones et al. | 323/222 |

* cited by examiner

Primary Examiner—Rajnikant B. Patel
(74) Attorney, Agent, or Firm—Fish & Richardson P.C.

(57) ABSTRACT

In general, in one aspect, the invention features a method, apparatus, and computer program product for use within a voltage regulator. It includes deactivating the voltage regulator; and periodically activating the voltage regulator to monitor and selectively refresh the output of the voltage regulator.

35 Claims, 4 Drawing Sheets

ULTRA-LOW-POWER MODE FOR A VOLTAGE REGULATOR

This is a continuation of application Ser. No. 09/797,892 filed Mar. 1, 2001.

BACKGROUND

This invention relates generally to voltage regulators and, in particular, to methods of reducing the quiescent current of voltage regulators. Voltage regulators, such as DC-to-DC converters, are used to provide stable voltage sources for electronic systems. Efficient DC-to-DC converters are particularly needed to extend battery run-time in low-power devices, such as mobile phones and hand-held computers.

Such devices impose a wide range of load current requirements upon voltage regulators. For example, the current requirements of a digital baseband or embedded processor load may reach several hundred milliamperes during an active state, such as a talk mode or compute mode, only to be throttled down to tens or units of microamperes during an idle mode. An important fraction of the device's energy may be consumed during this idle mode.

SUMMARY

In general, in one aspect, the invention features a method, apparatus, and computer program product for use within a voltage regulator. It includes deactivating the voltage regulator; and periodically activating the voltage regulator to monitor and selectively refresh the output of the voltage regulator.

Particular implementations can include one or more of the following features. The voltage regulator includes active elements and inactive elements, and deactivating includes eliminating quiescent current in at least one of the active elements. Periodically activating includes periodically restoring quiescent current in at least one of the active elements. Restoring includes restoring quiescent current in an output monitor configured to monitor the output level of the voltage regulator. The output monitor asserts a refresh signal when the level of the output of the voltage regulator deviates from a predetermined range, and the invention further includes restoring quiescent current in a pulse generator when the monitor asserts the refresh signal, thereby refreshing the output of the voltage regulator. The output monitor receives a predetermined reference voltage from a reference voltage generator, and restoring further includes restoring quiescent current in the reference voltage generator. Deactivating includes deactivating the voltage regulator when an ultra-low-power mode input signal is detected. Periodically activating includes repeatedly activating the voltage regulator based on a periodic signal. Periodically activating further includes receiving the periodic signal; waiting for a predetermined number of cycles of the periodic signal; and activating the voltage regulator after waiting.

In general, in another aspect, the invention features a controller for use within a voltage regulator. It includes a timer configured to assert a periodic check signal; and a logic module configured to deactivate the voltage regulator and to thereafter periodically activate the voltage regulator to monitor and selectively refresh the output of the voltage regulator in response to the check signal.

Particular implementations can include one or more of the following features. It includes an output monitor configured to monitor the output level of the voltage regulator when the logic module asserts a monitor enable signal, and to shut down when the logic module does not assert the monitor enable signal. The output monitor is configured to assert a refresh signal when the level of the output of the voltage regulator deviates from a predetermined range and the monitor enable signal is asserted; and the logic module is configured to assert a pulse enable signal when the refresh signal is asserted. The invention includes a pulse generator configured to cause the voltage regulator to refresh the output of the voltage regulator when the refresh signal and pulse enable signals are asserted. The invention includes a reference voltage generator configured to supply a predetermined reference voltage to the output monitor. The timer includes a counter configured to assert the check signal every n cycles of a clock signal, where n is programmable. The timer is configured to assert the check signal when an ultra-low-power mode signal is asserted. The clock signal is external to the controller. The invention includes a clock generator configured to provide the clock signal. The voltage regulator has a buck topology and the counter is powered by the output of the regulator. The voltage regulator has a boost topology and the counter is powered by the input to the regulator.

In general, in yet another aspect, the invention features a voltage regulator. It includes a timer configured to assert a periodic check signal; and a logic module configured to deactivate the voltage regulator and to thereafter periodically activate the voltage regulator to monitor and selectively refresh the output of the voltage regulator in response to the check signal.

Particular implementations can include one or more of the following features. The invention includes an output monitor configured to monitor the output level of the voltage regulator when the logic module asserts a monitor enable signal, and to shut down when the logic module does not assert the monitor enable signal. The output monitor is configured to assert a refresh signal when the level of the output of the voltage regulator deviates from a predetermined range and the monitor enable signal is asserted; and the logic module is configured to assert a pulse enable signal when the refresh signal is asserted. The invention includes a pulse generator configured to cause the voltage regulator to refresh the output of the voltage regulator when the refresh signal and pulse enable signals are asserted.

Advantages that can be seen in implementations of the invention include the following. Use of embodiments of the present invention can result in a reduction in the quiescent current of the switching regulator and a significant increase in battery standby time for portable devices.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Conventional low-power devices such as mobile phones and handheld computers generally feature three power modes, referred to herein as "on," "off," and "low-power." The voltage regulator which powers the embedded processor and dynamic random access memory (DRAM) of the device must support all three power modes.

A low-power device spends most of its battery life in the "off" power mode. In the "off" power mode, the voltage regulator supplies a very small amount of current, on the order of a few microamperes (uA), to power the real time clock and to support the DRAM in self-refresh mode.

When the device is in the "on" mode, the regulator must provide large load currents, on the order of hundreds of milliamperes (mA). Such large load currents demand a large output capacitor to maintain an acceptable voltage sag during peak loads. For example, the state-of-the-art VT102™ switching regulator produced by Volterra Semiconductor Corporation has a 22 uF output capacitor that supports load currents of 600 mA.

In the "low-power" mode, conventional regulators ensure that their large power MOSFETs do not switch unnecessarily. The regulators actively and continuously monitor the output voltage and switch the power MOSFETs only when necessary to "refresh" the output of the converter. For example, when the regulator's output voltage falls below a predetermined reference voltage, the power MOSFETs are switched to refresh that output voltage.

To actively monitor the output voltage, the regulator includes a reference voltage generator and a comparator or operational amplifier which are continuously powered to compare the output and reference voltages. In one implementation, the output and reference voltages are compared directly. In another implementation, the output voltage is divided down and compared with a reduced reference voltage. A resistor divider can be used to divide the output voltage.

The quiescent current of the regulator is dominated by the static current in the reference generator and comparator. In conventional state-of-the-art regulators, this quiescent current is around 10 uA. In many low-power devices, this quiescent current constitutes an important dissipator of scarce energy resources.

The inventor has recognized that the energy stored in the large capacitor required by the "on" power mode is sufficient to operate the load for long periods of time during the "off" power mode. Therefore, in implementations of the invention, in the "off" power mode, the active elements of the voltage regulator are shut down for long periods of time, and are periodically turned on to determine whether the output of the voltage regulator should be refreshed. This technique can be applied to implement an "ultra-low-power" mode that, in practical applications, can reduce the quiescent current of the voltage regulator to less than 1 uA.

Figure 1:
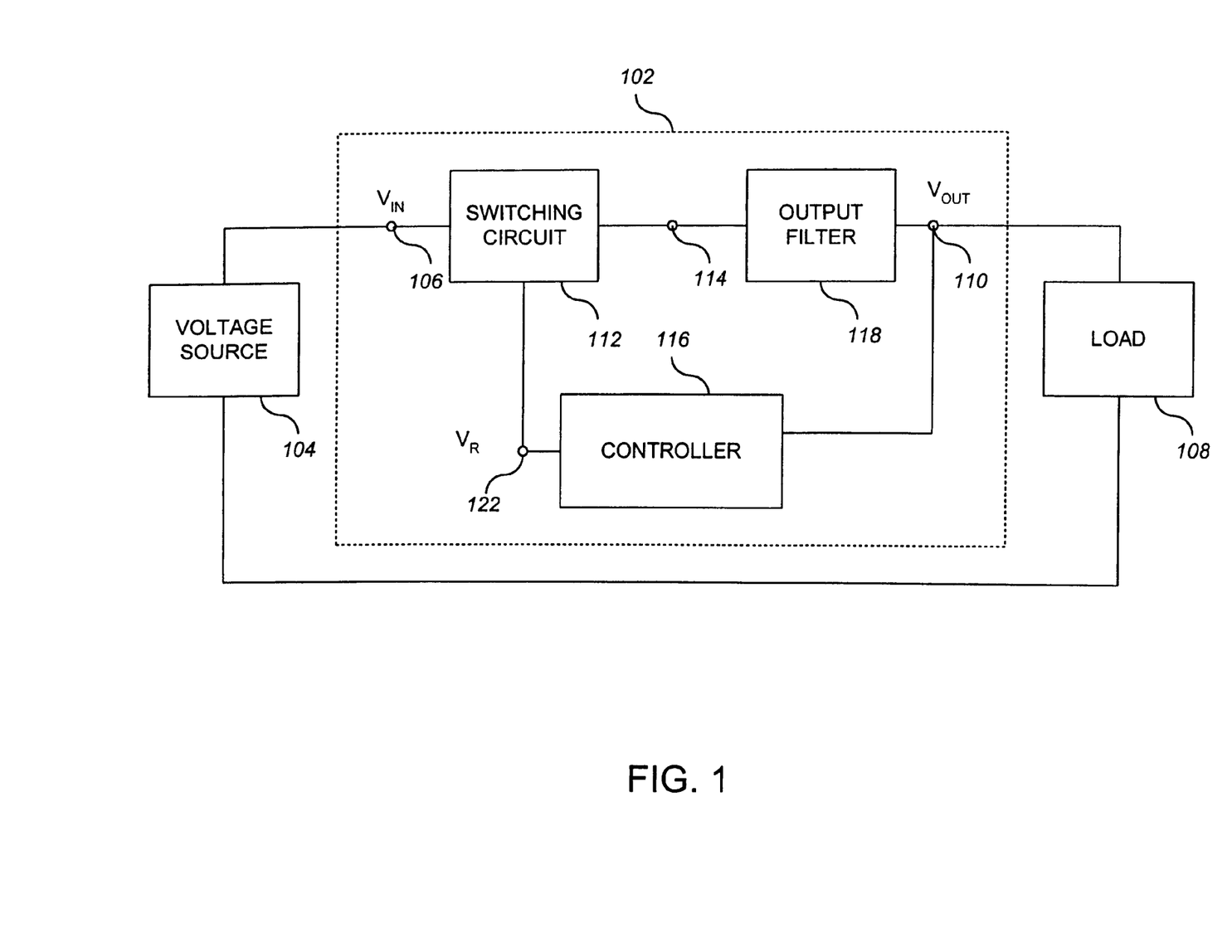
FIG. 1 depicts a switching voltage regulator coupled to an unregulated DC voltage source and a load according to one implementation.

Referring to FIG. 1, a switching voltage regulator 102 is coupled to an unregulated DC voltage source 104, such as a battery, by an input terminal 106. The switching regulator 102 is also coupled to a load 108, such as an integrated circuit, by an output terminal 110. The switching regulator 102 serves as a DC-to-DC converter between the input terminal 106 and the output terminal 110. The switching regulator 102 includes a switching circuit 112 which serves as a power switch for alternately coupling and de-coupling the input terminal 106 to an intermediate terminal 114. In some applications, such as a buck converter topology, the switching circuit 112 sometimes couples the intermediate terminal 114 to ground and sometimes couples the intermediate terminal 114 to the input terminal 106.

The switching regulator also includes a controller 116 for controlling the operation of the switching circuit 112. The controller 116 causes the switching circuit 112 to convert the substantially DC input voltage $V_{IN}$ at the input terminal 106 into an intermediate voltage having a rectangular waveform at the intermediate terminal 114.

The intermediate terminal 114 is coupled to the output terminal 110 by an output filter 118. The output filter 118 converts the rectangular waveform at the intermediate terminal 114 to a substantially DC output voltage $V_{OUT}$ at the output terminal 110. The switching circuit 112 and the output filter 118 are shown in a buck converter topology in FIG. 1, but can also be used in another topology, such as a boost or buck-boost topology.

The output voltage is regulated, or maintained at a substantially constant level, by controller 116. Controller 116 measures electrical properties of the output, such as output voltage and/or output current, and compares these properties to a control electrical property, such as reference voltage. Based on this comparison, controller 116 generates a pulse $V_R$ at terminal 122. The duration of pulse $V_R$ is selected according to methods well-known in the relevant arts. Switching circuit 112 operates its switches according to the pulse $V_R$.

Figure 2:
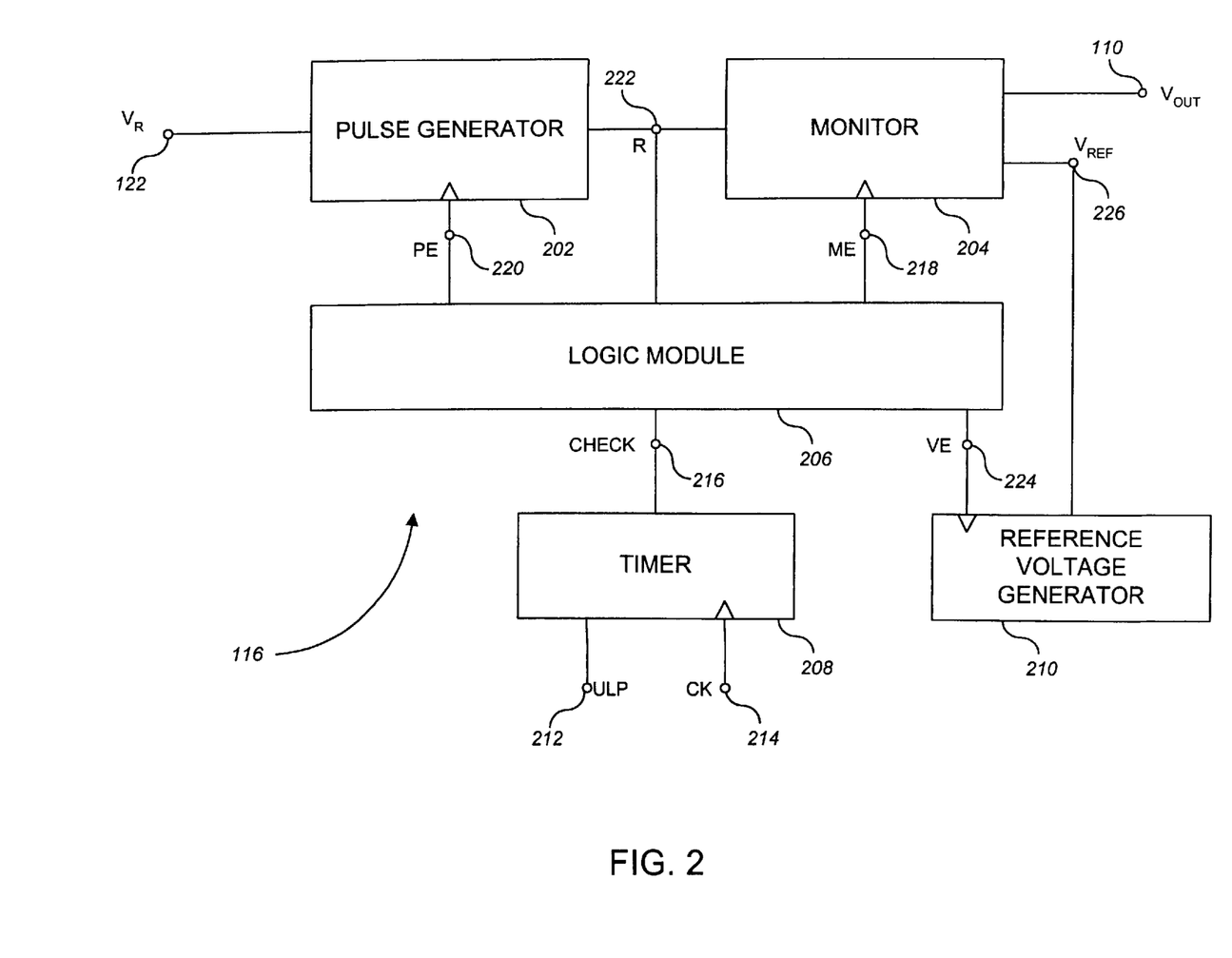
FIG. 2 depicts a controller according to one implementation.

Controller 116 implements an ultra-low-power mode. In response to a control input, controller 116 deactivates voltage regulator 102. Subsequently controller 116 periodically activates voltage regulator 102 to monitor and selectively refresh the output of voltage regulator 102. Referring to FIG. 2, controller 116 includes a pulse generator 202, a monitor 204, a logic module 206, a timer 208 and a reference voltage generator 210.

Voltage regulator 102 includes both active and inactive elements. The active elements consume quiescent current and include pulse generator 202, monitor 204, and reference voltage generator 210. The inactive elements consume no quiescent current so long as their inputs remain unchanged. The active elements consume power even in an idle state. Controller 116 deactivates voltage regulator 102 by shutting down (that is, eliminating quiescent current in) at least one of the active elements. Controller 116 activates voltage regulator 102 by restoring quiescent current in at least one of the active elements. Apparatus and techniques for eliminating quiescent current in, and restoring quiescent current in, active elements are well-known in the relevant arts. For example, an active element can include a bias switch that responds to an enable signal.

During nominal operations (for example, during modes other than ultra-low-power mode), logic module 206 enables the active elements within controller 116. Logic module 206 asserts a VE signal at terminal 224, thereby enabling (that is, restoring quiescent current in) reference voltage generator 210. Logic module 206 asserts an ME signal at terminal 218, thereby enabling (that is, restoring quiescent current in) monitor 204. Logic module 206 asserts a PE signal at terminal 220, thereby enabling (that is, restoring quiescent current in) pulse generator 202.

While thus enabled, pulse generator 202, monitor 204, and reference voltage generator 210 operate as follows. Reference voltage generator 210 generates a reference voltage $V_{REF}$ at terminal 226. In one implementation, monitor 204 includes a resistor divider and compares the divided version of $V_{OUT}$ to $V_{REF}$. In another implementation, monitor 204 directly compares $V_{REF}$ and $V_{OUT}$. Monitor 204 monitors the output level of voltage regulator 102 and asserts a refresh signal when the output level deviates from a predetermined range. Monitor 204 compares the output level $V_{OUT}$ of the voltage regulator to $V_{REF}$, and instructs pulse generator 202 accordingly. For example, when the difference between $V_{REF}$ and $V_{OUT}$ exceeds a predetermined threshold, monitor 204 asserts a refresh signal R at terminal 222. In response, pulse generator 202 determines an appropriate pulse $V_R$, and asserts this pulse $V_R$ at terminal 122. The pulse $V_R$ affects the operation of switching circuit 112, which brings the difference between $V_{REF}$ and $V_{OUT}$ below the predetermined threshold according to well-known methods.

Figure 3:
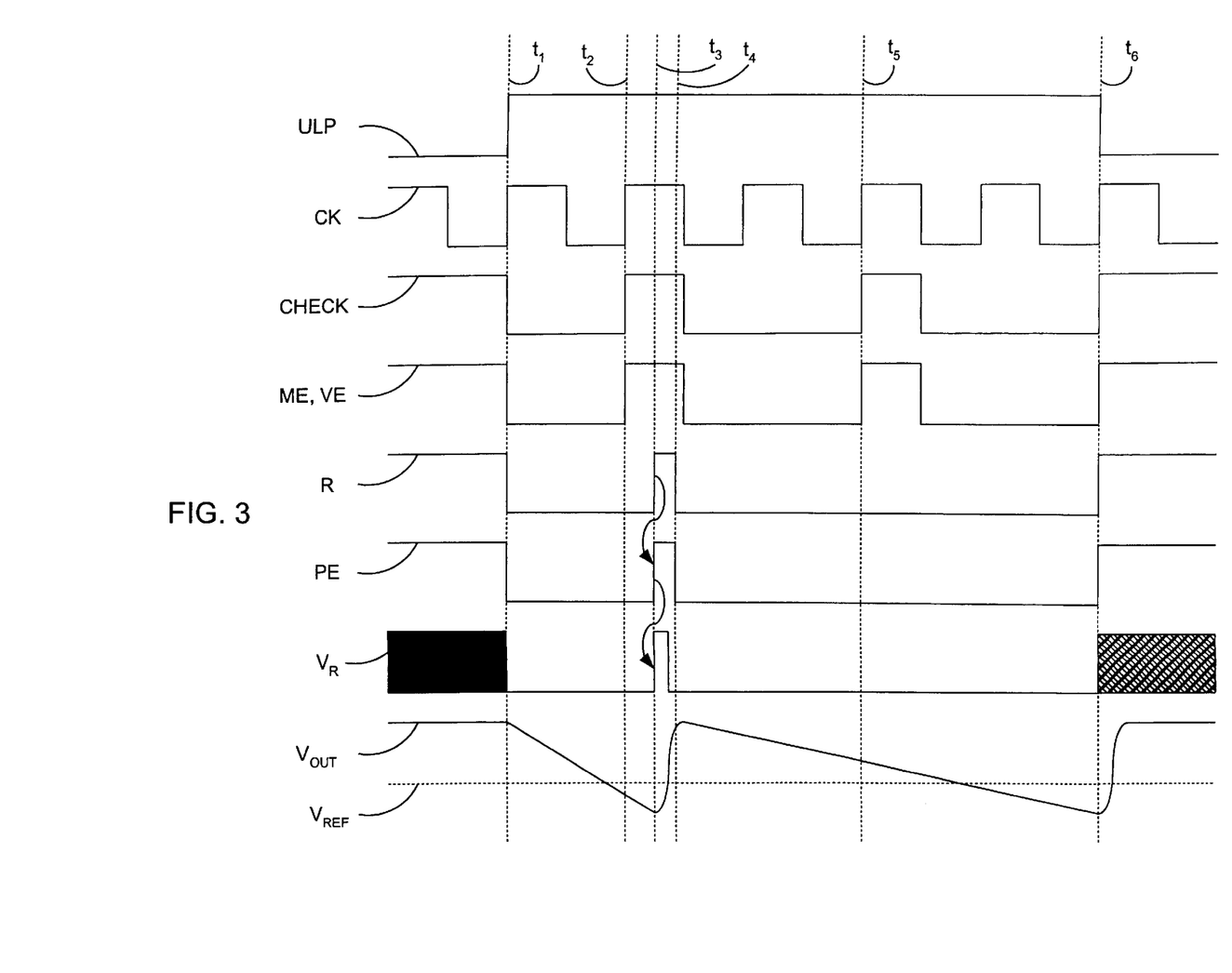
FIG. 3 is a timing diagram for an example operation of one implementation.

FIG. 3 is a timing diagram for an example operation of one implementation. When ultra-low-power mode is desired, a control circuit external to voltage regulator 102 asserts a control signal. In a first implementation, the control signal is asserted as a ULP signal at terminal 212. Referring to FIG. 3, the ULP signal is asserted at time $t_1$.

In a second implementation, the control signal is asserted by applying an oscillating signal, such as a clock signal CK, at terminal 214. In the second implementation, no ULP signal is used, rendering terminal 212 unnecessary.

In the first implementation, timer 208 responds to the ULP signal by asserting a periodic CHECK signal at terminal 216. In both the first and second implementations, the timing of the CHECK signal is derived from clock signal CK at terminal 214.

During nominal operations, the CHECK signal is always high. Logic module 206 responds by asserting enable signals as described above. However, when the ULP signal is asserted, the CHECK signal goes low periodically to save power. In response to a low CHECK signal, logic module 206 disasserts the enable signals. Referring to FIG. 3, the CHECK, ME, VE, and PE signals all go low at time $t_1$.

Figure 4:
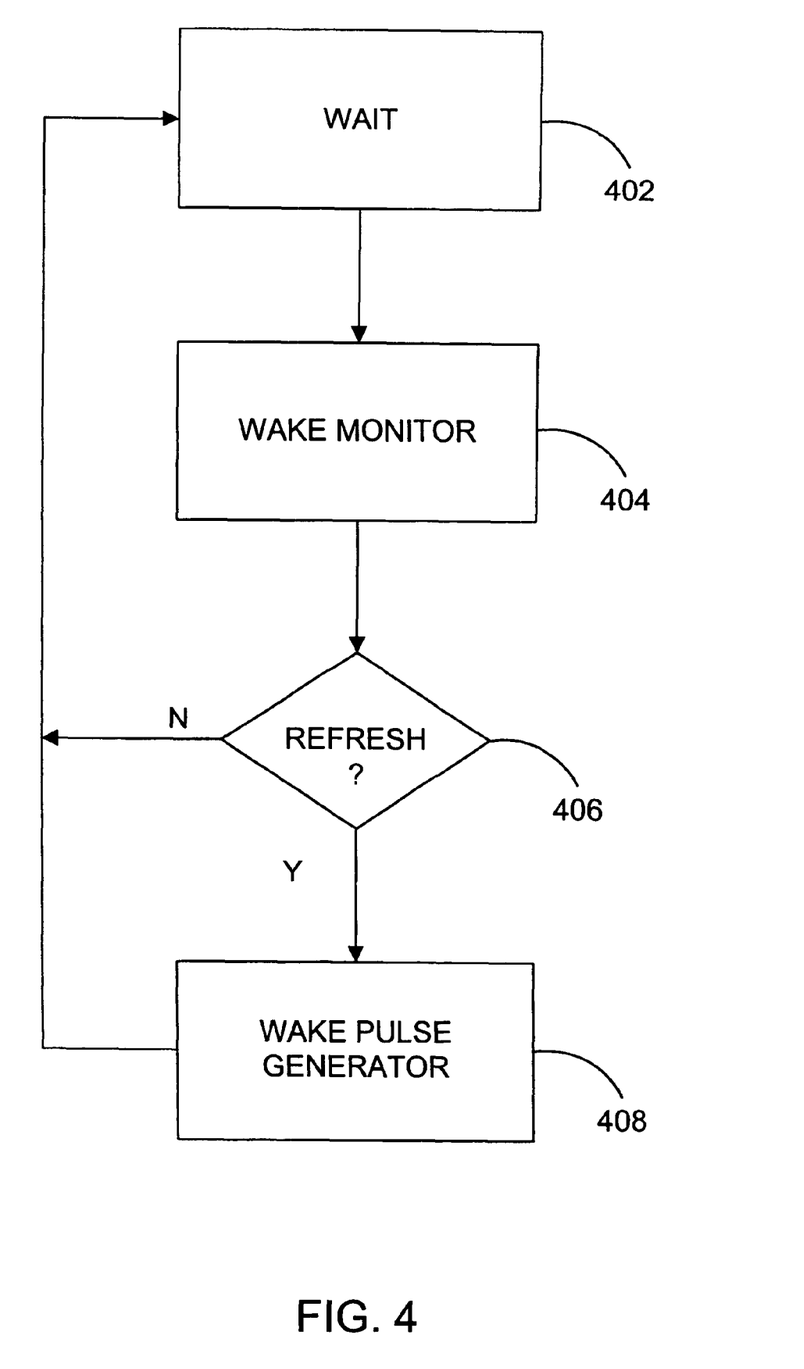
FIG. 4 is a flowchart depicting the operation of the controller in ultra-low-power mode according to one implementation.

FIG. 4 is a flowchart depicting the operation of the controller in ultra-low-power mode according to one implementation. The operation is periodic, and begins with a wait state, during which the CHECK signal is low, as shown at 402. During this interval, the regulator consumes only leakage current.

The CHECK signal periodically goes high. In the first implementation, the CHECK signal goes high every n cycles of the clock signal CK. Referring to FIG. 3, n is 2. In other implementations, n is 3 or more. Higher values of n result in greater power savings.

In one implementation, a counter within timer 208 receives clock signal CK, and asserts the CHECK signal every n clock cycles. The number n can be programmable. For example, the controller can be fabricated as part of an integrated circuit with a metal mask option to select n. As another example, the controller can be fabricated as part of an integrated circuit that senses an external resistor such that n is set by the resistance of the resistor. As another example, n can be selected by an external control signal.

The timer is designed for low power by minimizing switched capacitance and choosing a sufficiently low frequency for clock signal CK. For example, using the 32 kHz external real time clock (preexisting in most systems) the timer's current can easily be below 100 nanoamperes. This current may be further reduced by operating the digital timer at the lowest system voltage. In implementations employing the buck topology, the timer can be powered by the output of the voltage regulator. In implementations employing the boost topology, the timer can be powered by the input to the voltage regulator.

At the end of the wait state, the controller wakes monitor 204, as shown at 404. At time $t_2$, on the rising edge of the CK signal, the CHECK signal is asserted. In response to the CHECK signal, some of the active elements are activated to monitor the output level of voltage regulator 102. In particular, logic module 206 asserts signals VE and ME, thereby restoring quiescent current in reference voltage generator 210 and monitor 204, respectively.

Monitor 204 determines whether it is necessary to refresh the output of the voltage regulator, as shown at 406. In various implementations, refresh is necessary when the output voltage falls below a predetermined threshold, exceeds a predetermined threshold, or diverges sufficiently from a predetermined reference voltage or voltage range. Referring to FIG. 3, monitor 204 determines that $V_{OUT}$ has diverged sufficiently from $V_{REF}$ to warrant waking pulse generator 202.

If monitor 204 determines that the output of the voltage regulator should be refreshed, the controller wakes the pulse generator to refresh the output, as shown at 408. If the output of the voltage regulator need not be refreshed, the controller returns to the wait state.

Referring to FIG. 3, because $V_{OUT}$ has diverged sufficiently from $V_{REF}$, monitor 204 asserts refresh signal R shortly after time $t_2$. Here, signal R is asserted as a high logic level. When signal R is high, logic module 206 asserts signal PE, thereby restoring quiescent current in pulse generator 202. Here, signal PE is asserted as a high logic level.

Referring to FIG. 3, PE is asserted at time $t_3$. Pulse generator 202 then generates a pulse $V_R$ of an appropriate duration, thereby refreshing the output of the voltage regulator. Logic module 206 then disasserts the enable signal PE at time $t_4$, and subsequently disasserts enable signals ME and VE at the next falling edge of clock signal CK. Timer 208 disasserts the CHECK signal at this time. After this operation, the controller returns to the wait state.

The CHECK signal is asserted again at time $t_5$. In response to the CHECK signal, logic module 206 asserts the ME and VE signals. In this case, however, monitor 204 determines that it is unnecessary to wake pulse generator 202, and therefore does not assert refresh signal R. At time $t_6$, the ULP signal is disasserted, causing nominal operations to resume.

The clock signal CK can be supplied by a source external to voltage regulator 102, such as the real-time clock present in many portable devices, which typically operates near 32 kHz. Alternatively, the source can be a clock generator within voltage regulator 102, provided that the power consumed by the clock generator can be kept low enough.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor, and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. Accordingly, other embodiments are within the scope of the following claims.

What is claimed is:

1. A switching voltage regulator, comprising:
   an output filter;
   a switching circuit to receive an input voltage, and to alternately couple and de-couple the input voltage to the output filter, thereby producing a regulated output voltage at the output filter;
   an output monitor to measure the output voltage of the voltage regulator, and to assert a refresh signal when the output voltage deviates from a predetermined voltage range, thereby causing the switching circuit to couple the output filter to the input voltage in response to the refresh signal, thereby returning the output voltage to within the predetermined voltage range;
   a timer to periodically assert a check signal; and
   a logic module to deactivate the output monitor when the check signal is not asserted, and to activate the output monitor when the check signal is asserted.

2. The switching voltage regulator of claim 1, wherein:
   the logic module deactivates the output monitor by removing quiescent current from the output monitor; and
   the logic module activates the output monitor by restoring quiescent current to the output monitor.

3. The switching voltage regulator of claim 1, further comprising:
   a reference voltage generator to generate a reference voltage, wherein the output monitor measures the output voltage of the voltage regulator with respect to the reference voltage;
   wherein the logic module deactivates the reference voltage generator when the check signal is not asserted, and activates the reference voltage generator when the check signal is asserted.

4. The switching voltage regulator of claim 3, wherein:
   the logic module deactivates the reference voltage generator by removing quiescent current from the reference voltage generator; and
   the logic module activates the reference voltage generator by restoring quiescent current to the reference voltage generator.

5. The switching voltage regulator of claim 3, further comprising:
   a pulse generator to generate a pulse in response to the refresh signal, wherein the switching circuit couples the output filter to the input voltage in response to the pulse for a duration of the pulse, thereby returning the output voltage to within the predetermined voltage range;
   wherein the logic module deactivates the pulse generator when the check signal is not asserted, and activates the pulse generator when the check signal is asserted and the refresh signal is asserted.

6. The switching voltage regulator of claim 5, wherein:
   the logic module deactivates the pulse generator by removing quiescent current from the pulse generator; and
   the logic module activates the pulse generator by restoring quiescent current to the pulse generator.

7. The switching controller of claim 5, wherein the logic module deactivates the switching circuit when the check signal is not asserted, and activates the switching circuit when the check signal is asserted and the refresh signal is asserted.

8. A controller for controlling a switching voltage regulator having a switching circuit configured to receive an input voltage, and to alternately couple and de-couple the input voltage to an output filter, thereby producing a regulated output voltage at the output filter, the controller comprising:
   an output monitor to measure the output voltage of the voltage regulator, and to assert a refresh signal when the output voltage deviates from a predetermined voltage range, thereby causing the switching circuit to couple the output filter to the input voltage in response to the refresh signal, thereby returning the output voltage to within the predetermined voltage range;
   a timer to periodically assert a check signal; and
   a logic module to deactivate the output monitor when the check signal is not asserted, and to activate the output monitor when the check signal is asserted.

9. The controller of claim 8, wherein:
   the logic module deactivates the output monitor by removing quiescent current from the output monitor; and
   the logic module activates the output monitor by restoring quiescent current to the output monitor.

10. The controller of claim 8, further comprising:
    a reference voltage generator to generate a reference voltage, wherein the output monitor measures the output voltage of the voltage regulator with respect to the reference voltage;
    wherein the logic module deactivates the reference voltage generator when the check signal is not asserted, and activates the reference voltage generator when the check signal is asserted.

11. The controller of claim 10, wherein:
    the logic module deactivates the reference voltage generator by removing quiescent current from the reference voltage generator; and
    the logic module activates the reference voltage generator by restoring quiescent current to the reference voltage generator.

12. The controller of claim 10, further comprising:
    a pulse generator to generate a pulse in response to the refresh signal, wherein the switching circuit couples the output filter to the input voltage in response to the pulse for a duration of the pulse, thereby returning the output voltage to within the predetermined voltage range;

wherein the logic module deactivates the pulse generator when the check signal is not asserted, and activates the pulse generator when the check signal is asserted and the refresh signal is asserted.

13. The controller of claim 12, wherein:
the logic module deactivates the pulse generator by removing quiescent current from the pulse generator; and
the logic module activates the pulse generator by restoring quiescent current to the pulse generator.

14. The controller of claim 12, wherein the logic module deactivates the switching circuit when the check signal is not asserted, and activates the switching circuit when the check signal is asserted and the refresh signal is asserted.

15. A controller for controlling a switching voltage regulator having a switching circuit configured to receive an input voltage, and to alternately couple and de-couple the input voltage to an output filter in response to a refresh signal generated by an output monitor, thereby producing a regulated output voltage at the output filter, the controller comprising:
in the output monitor, means for measuring the output voltage of the voltage regulator, and asserting the refresh signal when the output voltage deviates from a predetermined voltage range, thereby causing the switching circuit to couple the output filter to the input voltage in response to the refresh signal, thereby returning the output voltage to within the predetermined voltage range;
means for periodically asserting a check signal; and
means for deactivating the output monitor when the check signal is not asserted, and activating the output monitor when the check signal is asserted.

16. The controller of claim 15, wherein means for deactivating the output monitor when the check signal is not asserted, and activating the output monitor when the check signal is asserted comprises:
means for removing quiescent current from the output monitor, and restoring quiescent current to the output monitor.

17. The controller of claim 15, wherein the voltage regulator comprises a reference voltage generator to generate a reference voltage, and wherein the output monitor measures the output voltage of the voltage regulator with respect to the reference voltage, further comprising:
means for deactivating the reference voltage generator when the check signal is not asserted, and activating the reference voltage generator when the check signal is asserted.

18. The controller of claim 17, wherein means for deactivating the reference voltage generator when the check signal is not asserted, and activating the reference voltage generator when the check signal is asserted, comprises:
means for removing quiescent current from the reference voltage generator, and restoring quiescent current to the reference voltage generator.

19. The controller of claim 10, wherein the voltage regulator comprises a pulse generator to generate a pulse in response to the refresh signal, and wherein the switching circuit couples the output filter to the input voltage in response to the pulse for a duration of the pulse, thereby returning the output voltage to within the predetermined voltage range, further comprising:
means for deactivating the pulse generator when the check signal is not asserted, and activating the pulse generator when the check signal is asserted and the refresh signal is asserted.

20. The controller of claim 19, wherein means for deactivating the pulse generator when the check signal is not asserted, and activating the pulse generator when the check signal is asserted and the refresh signal is asserted, comprises
means for removing quiescent current from the pulse generator, and restoring quiescent current to the pulse generator.

21. The controller of claim 19, further comprising:
means for deactivating the switching circuit when the check signal is not asserted; and
means for activating the switching circuit when the check signal is asserted and the refresh signal is asserted.

22. Computer-readable media embodying instructions executable by a computer to perform a method for controlling a switching voltage regulator having a switching circuit configured to receive an input voltage, and to alternately couple and de-couple the input voltage to an output filter in response to a refresh signal generated by an output monitor, thereby producing a regulated output voltage at the output filter, the method comprising:
in the output monitor, measuring the output voltage of the voltage regulator, and asserting the refresh signal when the output voltage deviates from a predetermined voltage range, thereby causing the switching circuit to couple the output filter to the input voltage in response to the refresh signal, thereby returning the output voltage to within the predetermined voltage range;
periodically asserting a check signal; and
deactivating the output monitor when the check signal is not asserted, and activating the output monitor When the check signal is asserted.

23. The media of claim 22, wherein:
deactivating the output monitor comprises removing quiescent current from the output monitor; and
activating the output monitor comprises restoring quiescent current to the output monitor.

24. The media of claim 22, wherein the voltage regulator comprises a reference voltage generator to generate a reference voltage, wherein the output monitor measures the output voltage of the voltage regulator with respect to the reference voltage, and wherein the method further comprises:
deactivating the reference voltage generator when the check signal is not asserted, and activating the reference voltage generator when the check signal is asserted.

25. The media of claim 24, wherein:
deactivating the reference voltage generator comprises removing quiescent current from the reference voltage generator; and
activating the reference voltage generator comprises restoring quiescent current to the reference voltage generator.

26. The media of claim 24, wherein the voltage regulator comprises a pulse generator to generate a pulse in response to the refresh signal, wherein the switching circuit couples the output filter to the input voltage in response to the pulse for a duration of the pulse, thereby returning the output voltage to within the predetermined voltage range, and wherein the method further comprises:
deactivating the pulse generator when the check signal is not asserted, and activating the pulse generator when the check signal is asserted and the refresh signal is asserted.

27. The media of claim 26, wherein:

deactivating the pulse generator comprises removing quiescent current from the pulse generator; and activating the pulse generator comprises restoring quiescent current to the pulse generator.

28. The media of claim 26, wherein the method further comprises:

deactivating the switching circuit when the check signal is not asserted; and activating the switching circuit when the check signal is asserted and the refresh signal is asserted.

29. A method for controlling a switching voltage regulator having a switching circuit configured to receive an input voltage, and to alternately couple and de-couple the input voltage to an output filter in response to a refresh signal generated by an output monitor, thereby producing a regulated output voltage at the output filter, the method comprising:

in the output monitor, measuring the output voltage of the voltage regulator, and asserting the refresh signal when the output voltage deviates from a predetermined voltage range, thereby causing the switching circuit to couple the output filter to the input voltage in response to the refresh signal, thereby returning the output voltage to within the predetermined voltage range;

periodically asserting a check signal; and deactivating the output monitor when the check signal is not asserted, and activating the output monitor when the check signal is asserted.

30. The method of claim 29, wherein:

deactivating the output monitor comprises removing quiescent current from the output monitor; and activating the output monitor comprises restoring quiescent current to the output monitor.

31. The method of claim 29, wherein the voltage regulator comprises a reference voltage generator to generate a reference voltage, and wherein the output monitor measures the output voltage of the voltage regulator with respect to the reference voltage, further comprising:

deactivating the reference voltage generator when the check signal is not asserted, and activating the reference voltage generator when the check signal is asserted.

32. The method of claim 31, wherein:

deactivating the reference voltage generator comprises removing quiescent current from the reference voltage generator; and activating the reference voltage generator comprises restoring quiescent current to the reference voltage generator.

33. The method of claim 31, wherein the voltage regulator comprises a pulse generator to generate a pulse in response to the refresh signal, and wherein the switching circuit couples the output filter to the input voltage in response to the pulse for a duration of the pulse, thereby returning the output voltage to within the predetermined voltage range, further comprising:

deactivating the pulse generator when the check signal is not asserted, and activating the pulse generator when the check signal is asserted and the refresh signal is asserted.

34. The method of claim 33, wherein:

deactivating the pulse generator comprises removing quiescent current from the pulse generator; and activating the pulse generator comprises restoring quiescent current to the pulse generator.

35. The method of claim 33, further comprising:

deactivating the switching circuit when the check signal is not asserted; and activating the switching circuit when the check signal is asserted and the refresh signal is asserted.

\* \* \* \* \*